United States Patent
Fuscone et al.

(10) Patent No.: US 10,822,119 B2
(45) Date of Patent: Nov. 3, 2020

(54) FUELLING ARRANGEMENT AND METHOD

(71) Applicant: Fuel Matrix Ltd, Maidenhead (GB)

(72) Inventors: Roy Fuscone, Maidenhead (GB); Timothy John Waite, Queensland (AU)

(73) Assignee: Fuel Matrix Ltd, Berkshire (GB)

( * ) Notice: Subject to any disclaimer, the term of this patent is extended or adjusted under 35 U.S.C. 154(b) by 0 days.

(21) Appl. No.: 16/178,095

(22) Filed: Nov. 1, 2018

(65) Prior Publication Data
US 2019/0135452 A1    May 9, 2019

Related U.S. Application Data

(63) Continuation of application No. 13/700,317, filed as application No. PCT/EP2011/054762 on Mar. 28, 2011, now abandoned.

(30) Foreign Application Priority Data

Mar. 29, 2010 (GB) .................................. 1005202.5

(51) Int. Cl.
*B64F 1/28* (2006.01)
*B64D 37/00* (2006.01)

(52) U.S. Cl.
CPC ................ *B64F 1/28* (2013.01); *B64D 37/00* (2013.01); *Y02T 50/44* (2013.01); *Y02T 50/82* (2013.01)

(58) Field of Classification Search
CPC .................................. B64F 1/28; B64D 37/00
USPC ...................................................... 244/135 A
See application file for complete search history.

(56) References Cited

U.S. PATENT DOCUMENTS

| 4,642,775 | A | 2/1987 | Cline |
| 5,006,829 | A | 4/1991 | Miyamoto |
| 6,038,498 | A | 3/2000 | Briffe |
| 8,010,242 | B1 * | 8/2011 | Ginsberg ............ G08G 5/0034 701/3 |

(Continued)

FOREIGN PATENT DOCUMENTS

| EP | 1595789 A1 * | 11/2005 | ............ B64D 37/00 |
| EP | 1595789 A1 | 11/2005 | |

OTHER PUBLICATIONS

Hill, Philip G., and Carl R. Peterson. Mechanics and Thermodynamics of Propulsion. 2nd Edition. Pearson Education, 2010. Chapter 5, Section 5.2, "Aircraft Range". (Year: 2010).*

(Continued)

*Primary Examiner* — Richard R. Green
*Assistant Examiner* — Steven J Shur
(74) *Attorney, Agent, or Firm* — Loginov & Associates, PLLC; William A. Loginov (57) ABSTRACT

A method of fuelling an aircraft for a flight to a predetermined destination in which the aircraft is loaded, the actual zero fuel weight of the loaded aircraft is determined, the fuel requirement of the loaded aircraft for that destination is calculated by fuel calculation software on the basis of operational flight plan data, said actual zero fuel weight, and further data relevant to fuel consumption for that instance of the flight to the predetermined destination, said further data being processed interactively by the user by means of a user interface to said fuel calculation software, and subsequently fuel to meet said fuel requirement is uplifted to the aircraft under the control of said user.

3 Claims, 4 Drawing Sheets

(56) References Cited

U.S. PATENT DOCUMENTS

| | | |
|---|---|---|
| 8,112,186 B2 | 2/2012 | Sylvester |
| 2007/0255489 A1 | 11/2007 | Jensen |
| 2008/0312776 A1* | 12/2008 | Sylvester ............... G01C 23/00 701/3 |
| 2012/0041619 A1 | 2/2012 | Rudduck |
| 2013/0046422 A1 | 2/2013 | Cabos |
| 2015/0120091 A1 | 4/2015 | Demy |
| 2015/0148992 A1 | 5/2015 | McDonough |
| 2015/0279218 A1 | 10/2015 | Irrgang |
| 2017/0234696 A1 | 8/2017 | Boesch |

OTHER PUBLICATIONS

Stroup J S et al, "A Fuel Management Model for the Airline Industry", Operations Research, Baltimore, MD, US, (Mar. 1, 1992), vol. 40, No. 2, doi:10.1007/BF02060479, Sep. 1991, pp. 229-237, XP009038209.

\* cited by examiner

| OFP DATA | | | | EXTRA FUEL CONSIDERATIONS | |
|---|---|---|---|---|---|
| FLT NBR | 123 | AC/REG | G-ABCD | PARKING TO ACTIVE RWY — Q1 | 15 MINS |
| DEST | EGKK | CRZ DEG | P* t.7 | ATTAIN YOUR PLND FLS — Q2 | YES◆ NO◇ |
| TRIP | 45318 | EZFW | 215700 | ANTICIPATE DEST HOLDING — Q3 | YES◆ NO◇ |
| CONT | 1359 | ETOW | 268248 | HOLDING FOR +10 MINS — Q4 | YES◇ NO◆ |
| T/O FUEL | 52548 | AZFW |  | DEST WX NEAR MINIMAS — Q5 | YES◇ NO◆ |
| ZFWCHG 1000 BURN | MS 173 | PS 183 | | LVP IN FORCE — Q6 | YES◇ NO◇ |

| CALCULATED FINAL FIGURES | HISTORICAL FACTS |
|---|---|
| ADJ RAMP FUEL 53.5<br>TRIP 44.8<br>TAXI 700 | EXPECTED HOLDING 8 MINS<br>PREDICTED LDG FUEL 6.3 |
| CALC   ACCPT   SHOW KYBD | EXIT   REJCT   SAVE EXIT |

Figure 6

| FLIGHT DATA | | | | ACTUAL FUEL FACTORS | |
|---|---|---|---|---|---|
| FLT NBR | 123 | AC/REG | G-ABCD | ATTAINED YOUR PLND FLS | YES◆ NO◇ |
| DEST | EGKK | | | DEST HOLDING | 8 MINS |
| OUT TIME | 1715 | OFF TIME | 1730 | DEST WX NEAR MINIMAS | YES◇ NO◆ |
| IN TIME | 2326 | ON TIME | 2319 | LVP IN FORCE | YES◇ NO◇ |
| FUEL REMN | 7.1 | | | WX AVOIDANCE REQD | YES◆ NO◇ |

| ADDITIONAL NOTES | COMMIT TO DEST   YES◇ NO◆ |
|---|---|
| | |
| SHOW KYBD | SAVE EXIT |

Figure 7

FUELLING ARRANGEMENT AND METHOD

The present invention relates to a fuelling arrangement and method, particularly but not exclusively for fuelling an aircraft, such as a passenger or cargo-carrying commercial airliner or a military aircraft for example.

Airline operators face severe challenges in operating profitably. Airlines also face increasing pressure to reduce carbon emissions and the associated footprint. A key factor in this is reducing fuel consumption to the lowest level possible, consistent with safety.

Preparations are in place for emissions trading in Europe (and in other parts of the world). Virtually all airlines with operations to, from and within the European Union (EU) will come under the scope of the EU's Emissions Trading Scheme (ETS) from 2012. Airlines were required to submit a monitoring plan by August 2009 and to monitor data from 2010. On 2 Feb. 2009, EU legislation (Directive EC/2008/101) came into force incorporating aviation into the EU ETS as from 2012. It is understood that civil aviation is one of the fastest growing sources of greenhouse gas emissions, showing long term compound annual growth rates of emissions of 3 to 4%. A key policy objective of the EU ETS will be to reduce airline emissions to the level at 2005 by 2050.

Many efforts are being made by the industry to achieve fuel savings through a variety of factors from aircraft design to operating procedures.

Currently, a passenger-carrying and/or cargo-carrying commercial aircraft is re-fuelled to a standby figure before and during loading and then topped up before push-back (tow vehicle manoeuvres the aircraft for engine start) prior to take-off with a total quantity of fuel set by an Operational Flight Plan (OFP) which is prepared by specialist ground staff typically two or three hours before take-off and takes into account the following:

i) the aircraft type (eg Boeing B777(RTM)) and the manufacturer's fuel consumption data for that type;
ii) a degradation factor determined empirically for that particular aircraft, which modifies the fuel consumption data of i) above by a percentage which is dependent on the age and condition of the airframe (for example dents will raise the fuel consumption);
iii) the anticipated aircraft weight(s);
iv) the anticipated route, speeds and flight levels;
v) expected taxiing time from the ramp (embarkation/loading point) to the runway, to allow for taxi fuel;
vi) anticipated meteorological conditions; and
vii) ATS (Air Transport Safety) procedures and restrictions (for example Final Reserve Fuel is carried to enable 30 minutes' flying at holding speed above the destination airport and Contingency Fuel is carried to allow for deviations from the expected route and weather conditions and to allow for a margin of error).

Typically, the OFP is passed to the captain in the form of a printed sheet shortly before boarding, or, as in some systems (e.g. the Cirrus' system), the OFP is transmitted electronically to the cockpit. It typically includes some guidance on modifying the fairly sophisticated fuel calculation used to generate the minimum fuel requirement listed in the OFP. For example, it will include an Estimated Zero Fuel Weight (EZFW) value for the aircraft which is the estimated total weight (including passengers, cargo and crew) but excluding the weight of the fuel. The Actual Zero Fuel Weight (AZFW) is determined after the aircraft has been loaded and is typically less than the EZFW because some passengers fail to embark or some cargo is not loaded. Whilst AZFW is more accurate that EZFW because it is based on accurate information (e.g. actual number of passengers boarding aircraft and weight of cargo), it should be noted that the values for AZFW are not accurately determined since they are typically based on estimates of passenger weights and hand luggage allowances. Accordingly the OFP gives the captain estimated values (typically based on accurate information) as an AZFW with which to adjust (typically, to reduce) the minimum fuel requirement in order to take this change in circumstances into account.

However this is a matter of discretion and, typically, not every change in circumstances which would lead to a change in minimum fuel requirement is flagged up by the OFP. For example, a change in runway will affect the taxiing time and hence the minimum fuel requirement.

The aircraft captain also has discretion to add extra fuel ("Extra Fuel") to that mandated by the OFP and often does so on the basis of e.g. changes in the weather or other factors of a more subjective nature, including lack of confidence in or ignorance of the safeguards built in to the fuel calculation. There is currently no consistency between the behaviour of captains in taking this action and there are currently no consistent guidelines provided to them.

In many cases the Extra Fuel is unnecessary. Since the fuel payload of an airliner is typically a significant proportion of the total weight of the aircraft, carrying this fuel involves significant extra fuel consumption of the order of 3-4%/hr of flight. So, for example, if one tonne of Extra Fuel were carried unnecessarily on a 12 hour flight, 12×4%=48% of the Extra Fuel would be burnt carrying its own weight, leaving only 520 kg of the Extra Fuel in the tank for future use on arrival at the destination. In other words, 480 kg of fuel would be completely wasted. This calculation disregards the additional fuel demands on take-off and landing imposed by the Extra Fuel. It also does not allow for the fact that this waste also leads to the production of additional carbon dioxide that could be avoided.

On the other hand, until and unless it may become the case that all fuel calculations are the sole responsibility of ground operations, it would not be prudent or acceptable to a captain to prevent him from uploading Extra Fuel; an element of discretion must be left in order to take into account discrepancies between the actual conditions and those on which the operational flight plan was predicated.

An object of the present invention is to overcome or at least alleviate some or all of the above problems.

Accordingly the invention provides a method of fuelling an aircraft for a flight to a predetermined destination wherein the aircraft is loaded, the actual zero fuel weight of the loaded aircraft is determined, the fuel requirement of the loaded aircraft for that destination is calculated by fuel calculation software on the basis of operational flight plan data, said actual zero fuel weight, and further data relevant to fuel consumption for that instance of the flight to the predetermined destination, said further data being processed interactively by the user by means of a user interface to said fuel calculation software, and subsequently fuel to meet said fuel requirement is uplifted to the aircraft under the control of said user.

Preferably said further data is entered at said user interface by the user. This enhances the involvement of the user in the fuel calculation and reduces the temptation to carry unnecessary extra fuel.

It is highly preferred that the user interface is on the aircraft, preferably on the flight deck, e.g. in the form of a screen and keyboard of the captain's laptop computer.

Typically the operational flight plan (OFP) data will include parameters dependent upon some or all of items i) to iv) and vii) noted above and the user (normally, the captain of the aircraft or perhaps the co-pilot or another responsible member of the flight crew) will be prompted to enter further data such as one or more of: the time expected to be spent taxiing to the runway (and expected taxiing time at destination airport), the holding time at the destination airport, the amount of contingency fuel carried and weather information (e.g. at departure, en-route and at destination), for example. Such data, even if included in the OFP, is liable to change between the time the OFP is generated and the time of final fuelling.

Optionally, the user will still be given the opportunity to add extra fuel but the interaction between the user and the further data using the user interface is expected to inspire further confidence in the fuel calculation and in practice to reduce the incentive for extra fuel which in nearly all cases should be unnecessary. Optionally, the user may override the fuel calculation software and enter its own figures, but should these figures be less than the calculated fuel requirement produced by the software, it is preferable that a warning system alerts the user (by visual or oral means— e.g. a warning notice or an alarm signal) and optionally other users or a third party, especially if the figures entered may result in a material breach of internal (airline specific policy) or industry safety rules.

A fuel calculation software used in accordance with the present invention is preferably configured to provide fuel requirement values for the loaded aircraft for the flight to the predetermined destination, which values include a safe contingency fuel amount. The safe contingency fuel amount is preferably programmed into the software and is typically selected to be at least the amount of contingency fuel required by industry regulations and optionally an amount determined by airline policy, the method of calculating contingency fuel being variable to account for adjustments in regulations and policies.

Even disregarding the above confidence factor, the improved accuracy obtainable by basing the calculation on current (dynamic) conditions is expected to result in fuel savings of up to 5%, e.g. from 0.5% to 4% and generally at least within the range 1% to 2.5%. Typically a printed OFP will give a fuel requirement to a precision of three significant figures so a saving of 1% is certainly significant. This also represents a large improvement in profit in a low-margin and highly competitive industry, as well as a significant reduction in carbon dioxide emissions which will have positive environmental and financial implications.

The user, as used herein in connection with fuel calculation software of the invention, an interface therefor, an aircraft (to which the fuel calculation software is applied), a computer programme according to the invention and computer so programmed, may be any user for whom the fuel calculation software could be effective (e.g. a person or group of people charged with responsibility for fuelling an aircraft with the appropriate amount of fuel for a flight, or a person or other entity responsible for an automated system for the same, or in the event that the control of fuelling is by an automated or computer system such as a third party planning solution, the user may be a third party flight planning solution configured to communicate via an application programming interface or API). The user may be, for example, any one or more of the captain, first officer, second officer, flight crew, technical crew, cockpit crew, pilot, co-pilot, flight dispatcher, flight operations staff, navigation services staff, company administrator, IT department staff, any management position holder or any other personnel of an organization responsible for aircraft fuelling and related efficiency activities (or an electronic user such as a suitably programmed flight planning solution system). As used herein, the user or any user type specified above may be substituted by generic user or other specific user where the context allows.

Preferably the data used includes statistical data based on previous instances of flights to said destination and selectably the statistical records of the operations of the individual aircraft or the type of aircraft and/or the individual pilot and the method includes means for reporting actual fuel consumption data after said flight. This is preferably performed by the user at the user interface and has the following advantages:

i) it enables the user to check actual fuel consumption against calculated fuel consumption and gives further confidence in the method; and ii) it enables the accuracy of the method to be improved by fine-tuning the operational flight plan data and/or the processing of the information entered by the user.

The invention also includes a computer program product comprising a computer-readable medium incorporating program code executable by a processor to implement the above processes and methods.

A typical process for calculating the fuel requirement for a flight by an aircraft to a pre-determined destination in accordance with the invention may include provision of a fuel calculation software or arrangement or such programmed computer and the provision of Operational Flight Plan (OFP) data. The Operational Flight Plan (OFP) is generally used herein in a generic sense and may include (the context assisting) an initial OFP, a revised OFP or a final/Master OFP (the latter being the Operational Flight Plan that the flight actually follows). As far as the method, arrangement/system and software according to the invention are concerned, OFP data (typically initial OFP data generated by ground staff or an OFP generating system in use by the airline) is an input to the method, arrangement/system and software of the invention and its source is not critical to the present invention, but the source should preferably address necessary regulatory compliance matters. OFP data may be communicated electronically to a system or arrangement comprising a computer programmed to produce fuelling information according to the invention, or may be manually entered (e.g. by the user via a physical interface) or may be transferred by way of an Application Programming Interface (API) between an application producing fuelling information according to the invention and a system for producing or generating Operational Flight Plans and associated data. Optionally, the arrangement for calculating the fueling requirement for an aircraft (and/or software or programmed computer therefore) according to the present invention may be adapted to form a part of or to seamlessly integrate or communicate with an operational flight planning system of which several exist.

In another aspect the invention provides an arrangement for calculating the fuel requirement of an aircraft flight to a predetermined destination, the arrangement comprising means for determining the actual zero fuel weight of the aircraft after it has been loaded, a programmed computer arranged to determine a fuel requirement for said flight on the basis of operational flight plan data, said actual zero fuel weight, and further data relevant to fuel consumption for that instance of the flight to the predetermined destination, said computer being programmed to process said further data interactively with a user at a user interface thereof.

Preferably said computer is arranged to receive said further data as an input at said user interface from the user.

This enhances the involvement of the user in the fuel calculation and reduces the temptation to carry unnecessary extra fuel.

It is highly preferred that the user interface is on the aircraft, preferably on the flight deck, e.g. in the form of a screen and keyboard of the captain's laptop computer.

Preferably said arrangement comprises a computer network including a first terminal which in use prompts the user to enter said information, said terminal being located on the aircraft, and a second terminal which in use transmits said operational flight plan data to said first terminal over said network.

Preferably said first terminal is arranged to transmit actual fuel consumption data for the completed aircraft flight to the network. This enables the interactive fuel calculation software to learn from the actual fuel consumption data and improve its accuracy on subsequent flights.

The network is preferably arranged to connect a plurality of software modules which exchange information, the modules including an interactive fuel calculation module (referred to below as the DYNAMIC module) which calculates said fuel requirement and optionally a MANAGEMENT module which typically comprises the algorithms upon which the calculations are based and which may be accessed by technical staff and/or a COMPLETE module which is used to record completed flight data and fuel consumption for comparison with predicted information. The MANAGEMENT module, if the system is so configured may communicate with an external operational flight plan module or system which generates operational flight plan data (or may be integrated with or form a part of an OFP system). The naming of modules herein is for convenience and should be considered in no way limiting.

Preferably the modules further include a module (referred to below as the COMPLETE module) which in use acquires actual fuel consumption data at the end of the flight (e.g. by prompting the user to enter such data, or by receiving fuel consumption data from the aircraft instrumentation) and transmits the actual fuel consumption data to the system management ("MANAGEMENT") module or to an operational flight plan module or system.

Another module, HISTORICAL, may be used to maintain a database of information concerning all aspects of external factors and their impact on the operational flight plans produced (e.g. by or in association with the MANAGEMENT module) and the calculations (e.g. of the DYNAMIC module). Preferably, the data is continually updated. Optionally, the data provided to the COMPLETE module (i.e. post-flight data) may also be submitted to the HISTORICAL database, in an anonymous fashion. The data in HISTORICAL may optionally be subject to a pattern recognition algorithm to identify inaccuracies in the HISTORICAL data used. For example, using such bulk data, it may be possible to determine that an efficiency deterioration factor needs to be increased for aircraft of a particular type as it ages, etc.

Such modular software has the advantage that different modules may be updated or modified independently.

The modules may be run on the same or different computers of the network but a thin client architecture is preferred in which the modules are all run on a server (typically on the ground) and the user's computer (typically on the aircraft) acts essentially as a terminal. This has an advantage that all users can benefit from upgrades (and the latest information) simultaneously.

A preferred embodiment of the invention is described below by way of example only with reference to FIGS. 1 to 7 of the accompanying drawings, wherein.

Figure 1:
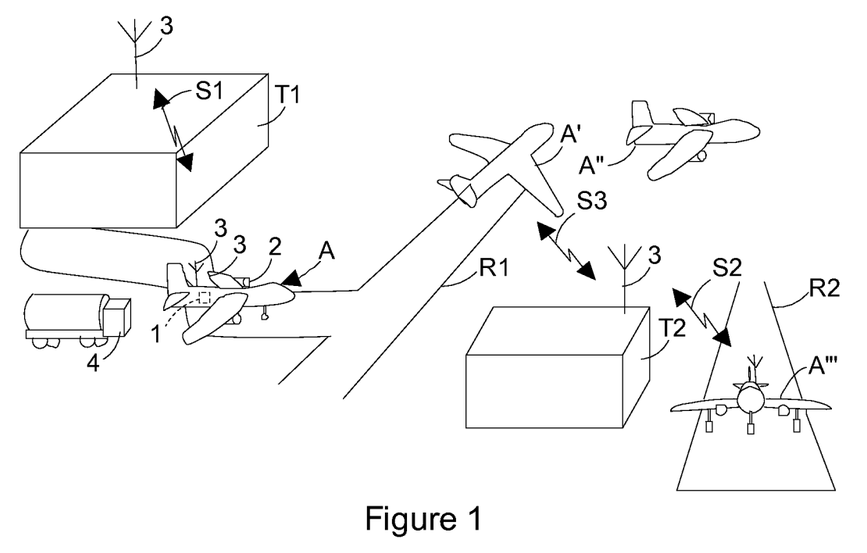
FIG. 1 is a diagrammatic illustration of an aircraft flight including a refuelling operation calculated by a method and arrangement in accordance with the invention.

Referring to FIG. 1, which gives an overview of the arrangement and method, an airliner A (in this case a Boeing B777(RTM)) is shown at the ramp of terminal T1 about to taxi to a runway R1 prior to take-off. The captain has the required software installed onto his on-board tough-notebook (class 1 & 2 device) or electronic flight bag (EFBs) class 3 device and runs a DYNAMIC software module after the aircraft has been loaded and the actual zero fuel weight (AZFW) of the aircraft has been determined. AZFW is determined by summing the known pre-loaded aircraft weight with typically an actual determined weight of baggage and an actual determined weight of passengers and crew (and their carry-on baggage) or an estimated weight of passengers and crew (and their carry-on baggage) according to a specific standard (which may be an internal, national or international authority standard). For example, a standard that may be used for calculating passenger weight is: i) 15 kg for a child under 2 years; ii) 40 kg for a child aged 2-13 years; and iii) 86 kg for an adult aged over 13 years (additional 3-5 kg may be added in winter months to account for average increase in weight of winter clothing). Alternatively, actual carriage weight could, in principle, be determined by utilizing strain gauges or the like fitted to the undercarriage or suspension system of the aircraft. A weight determining means or strain-gauge means or the like adapted to fit or releasably attach to an aircraft, e.g. undercarriage or suspension system, to enable aircraft carriage load weight to be determined prior to takeoff is a further aspect. Optionally, said means is configured with a communication means for communicating the carriage load weight to a microprocessor and/or for use of the carriage load weight as input data into the method of fuelling and arrangement for calculating inventions herein defined.

As an option, in order to facilitate an actual determined weight of passengers and crew (and their carry-on baggage), which may be utilized as input data (or further data) in the method of fuelling and arrangement for calculating inventions herein defined, e.g. as input data for the DYNAMIC or LIVE modules described, there is provided, for generally applicability, as a further aspect of the invention a method of determining the actual individual and/or combined weight of passengers (typically boarding pass-carrying passengers) and/or crew intending to board an aircraft, the method comprising providing a weighing device for weighing individual or groups of passengers and/or crew who engage said weighing device (e.g. by standing on it for a minimum set time) and requiring all passengers and/or crew intending to board or boarding the aircraft to engage said weighing device, recording the data for individual and/or groups of passengers and/or crew and, preferably, calculating therefrom a total passenger and/or crew weight for the flight. Preferably, the weight data stored is stored electronically and communicated by electronic means as input data to a flight-specific calculation in a microprocessor loaded with a fuel calculation software. Preferably, individual passenger and/or crew weight data may be attributed to the individual passenger and/or crew member by further requiring that the passenger and/or crew provides identification (e.g. by way of a boarding pass or id card) to enable weight data to be attributed to the individual (e.g. by a boarding pass reader or identification pass reader configured to be in electronic communication with a microprocessor receiving individual weight data). Preferably, the passengers and/or crew are required to be weighed with the hand luggage they intend to carry on board. [Optionally, in a further aspect, a passenger may be required to provide identification associated with payment details, e.g. a credit card or loyalty cart, whereby charges may be applied or rebate issued according to a pre-determined scale according to whether the passenger is above or below pre-determined maxima and minima boarding weights included in the purchase price. Such additional charge and/or rebate system may act as an incentive to reduce weight in carriage].

In a further, associated, aspect, there is provide a system for determining the weight of passengers and/or crew boarding an aircraft, the system comprising a weighing station comprising a weighing device for measuring the weight of a passenger or crew member engaging the weight device and generating individual weight data and an identification means for identifying the passenger or crew member being weighed, said weighing device and identification means preferably being configured such that individual weight data is attributed to specific passenger or crew member. The system further comprises a microprocessor or communication means for storing and/or communicating the individual or cumulative weight data and identification information, optionally co-attributed. The weight and identification data generated may then be used as input data or further data (e.g. to the DYNAMIC or LIVE modules described) for the calculation of flight fuel requirement for a specified aircraft flight. In one embodiment, the system is configured to weigh the passengers and/or crew without their carry-aboard hand-luggage by, for example, conducting the weighing step during the scanning of hand-luggage routinely carried out at airports as a security measure, the hand-luggage being weight cumulatively on a separate weighing device configured to fit in-line with a scanning system. Preferably, however, in order to provide the most accurate data, the system is configured to enable weighing of passengers and/or crew with their hand luggage and preferably as close as possible to the boarding of the aircraft, e.g. at the departure gate or at (e.g. just before or just after) the door to the aircraft. [Optionally, the system is further provided with a payment card reader, such as a credit card reader, or is configured to associate the boarding pass or id card to a payment method, and which system is programmed to draw a further charge or issue a rebate from the payment means according to whether the weight attributed to that passenger and its hand luggage is greater than or less than pre-determined limits included in a ticket price].

The AZFW as discussed above is typically an estimated value based upon accurate information (e.g. actual number of passengers with estimated weight, estimated weight of hand luggage and actual weight of cargo), which we may term standard-AZFW. Preferably, the AZFW is an accurately determined value, which herein means that actual passenger weight and actual cargo weight is utilized in the AZFW value calculation, which may be referred to as accurately determined-AZFW. Where the AZFW is an accurately determined value (e.g. as discussed above), the term AZFW used herein may optionally be substituted with accurately determined-AZFW (or AD-AZFW) as a preferred feature.

As explained in more detail below, the Captain enters the AZFW value and other last-minute information such as the actual runway (R1) which affects the taxiing time and hence taxiing fuel consumption, the expected weather and the expected holding time at the destination terminal (T2). The DYNAMIC software module calculates the parameters ADJ RAMP FUEL (total fuel, which illustrates the weight of fuel required to be uploaded (at the ramp) to the aircraft for the flight), TRIP & TAXI (the expected fuel consumption during flying and during taxiing respectively) and displays HISTORICAL FACTS for EXPECTED HOLDING (information on the expected fuel consumption during holding before landing at the destination runway R2, explained in detail below) and PREDICTED LDG FUEL (the predicted quantity of fuel remaining on landing). This is based on the data entered together with data predictions from software algorithms provided to the DYNAMIC module from a MANAGEMENT software module. Note, it is usual practice to fuel an aircraft to some quantity less than that proposed on the OFP, to allow for adjustments in fuelling calculations by the captain, for example allowing more up-to-date information on cargo weight and passenger numbers. This depends upon an airline policy and aircraft type, but may be OFP minus 3 tonnes for example. The total calculated fuel requirement for the flight is the standby fuel figure (that initial fueling amount) plus the additional amount added at the ramp as a result of calculations—this is the ADJ RAMP FUEL, being the total desired fuelling level determined at the ramp.

The above algorithms incorporate safeguards based on regulatory requirements which ensure that the minimum fuel needed to satisfy these requirements is carried.

The algorithms take into account the fuel required to start the main engines 2, the fuel used by the aircraft's auxiliary power unit (APU) 1, the fuel used during taxiing to runway R1 and from runway R2, the fuel expected to be used in flight and the fuel used on landing.

The captain has discretion to increase the quantity of fuel actually uplifted to the aircraft, as in the prior art based on printed operational flight plans, but the interactive software incorporated in the DYNAMIC module enables him to calculate the implications of this—for example the amount of the additional fuel that will be expended simply in carrying its own weight. The required fuel is uplifted from a bowser 4.

Information required by the captain's computer is received via e.g. a WiFi network from a server computer in (for example) the terminal T1, as indicated by wireless signal Si from antenna 3 on the terminal which is received by a further antenna 3 on the aircraft. All the network signals are preferably encrypted.

It should be noted that the DYNAMIC module as well as the other software modules are preferably all run on the server computer and that the captain's computer acts as a thin client, providing the user interface and the basic network communication. Accordingly the further data as well as the operational flight plan data can be received and processed by the server and the results transmitted (within signal Si) to the captain's laptop via the WiFi network. The input from the captain at the user interface during the processing of the further data is transmitted to the server over the WiFi network. Thus the network link between the flight deck computer and the server in terminal 1 is bidirectional.

The aircraft then takes off (A') flies (A") to the destination and lands (A'") at runway R2 at the destination. After taxiing to the destination terminal T2 is completed, the captain notes the actual fuel remaining (LDG FUEL) and compares it with the predicted value (PREDICTED LDG FUEL) calculated by the DYNAMIC module. This and related data are communicated via antennae 3 of the WiFi network to a further computer in terminal T2, using a further software module, COMPLETE. Assuming the fuel consumption prediction was accurate, this provides further confidence in the system and enables the algorithms to be fine-tuned if necessary.

Further detail is given below.

Figure 2:
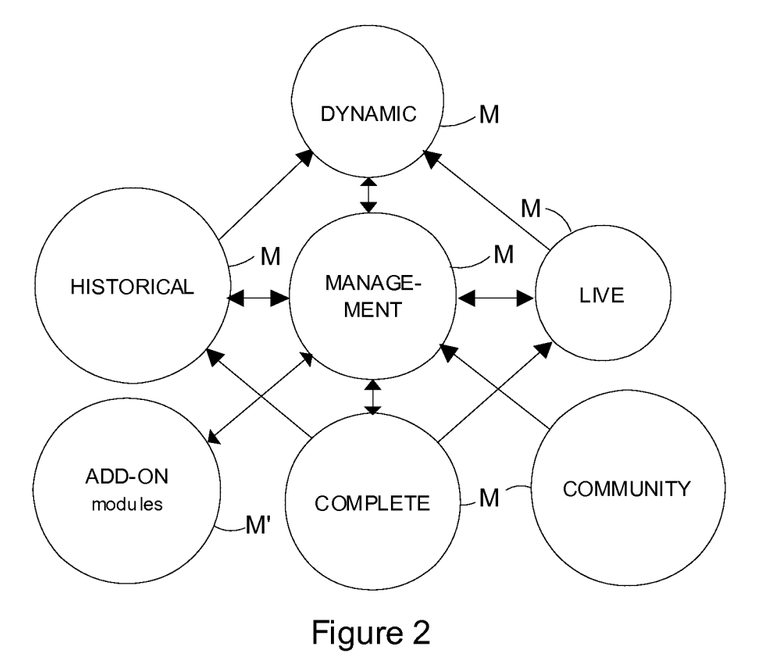
FIG. 2 is a diagram of the software modules utilised in the arrangement of FIG. 1.

Referring to FIG. 2, the relationship between the software modules M is shown. The arrows depict information flow (single direction or bidirectional) between the modules.

The modules (termed Fuel Matrix modules) are as follows:

i) Fuel Matrix DYNAMIC

This is a core application utilised by the captain of the aircraft as the main application during pre-flight duties to assist the flight deck with recommended fuel uplifts in line with company policies. It requires OFP data field entries (automatic or manual) together with responses to extra fuel considerations to present recommended fuel figures. To assist, related historical facts are provided from the HISTORICAL module and live data is available from the LIVE module. Typically, the time taken by the captain for data entry is 90 seconds. The calculation machine predominately operates within this application with inputs from/changes to the Fuel Matrix MANAGEMENT module tailoring these calculations.

ii) Fuel Matrix COMPLETE

This is a core application utilised during post-flight duties to record actual fuel factors to enhance the Fuel Matrix LIVE and Fuel Matrix HISTORICAL modules. The average data field entry time is 45 seconds. This module is primarily for use in data collation/distribution within the software suite.

iii) Fuel Matrix MANAGEMENT

This is a core application utilised only by specialist airline administrators to define a generic or route specific benchmark and offer optimisation and standardisation. This application inputs data for and/or modifies the algorithms utilised in the DYNAMIC module. In this manner the DYNAMIC application can be fine tuned to influence results and fuel cost savings. The MANAGEMENT module also provides control for the other modules, with the exception of the COMMUNITY module.

iv) Fuel Matrix LIVE

This is an add-on application utilised by the flight crew immediately before fuelling to view user-defined live data to assist with extra fuel considerations. When the captain or other members of the flight crew are answering the extra fuel consideration questions in the FUEL MATRIX dynamic application, they can check on live data i.e. most recent reports of holding at destinations, weather encountered and avoided on routes, runways in use and other information relevant to fuel consumption for their particular flight. This module can be customised by different users or airlines.

v) Fuel Matrix HISTORICAL

This is an add-on application utilised by the flight crew to view user-defined facts derived from previous flight statistics to assist with extra fuel considerations. When the flight crew are answering the extra fuel consideration questions in the Fuel Matrix DYNAMIC application and reviewing recommended fuel loads, they can check on historical data to build confidence in the results of the fuel calculation such as predicted arrival fuel and anticipated holding times for example. This module can be customised by different users or airlines.

vi) Fuel Matrix COMMUNITY

This is an add-on website chat forum application utilised by pilots/management/air traffic controllers and others to stimulate fuel cost saving and monitoring discussions (threads) with simple user-friendly functionality. The website can provide aviation news, fuel prices, chat forums, information on fuel related issues and the like and feeds information to the MANAGEMENT module.

vii) ADD-ON Modules

Further modules M' may be developed in the future and the MANAGEMENT module is arranged to communicate with such modules.

Figure 3:
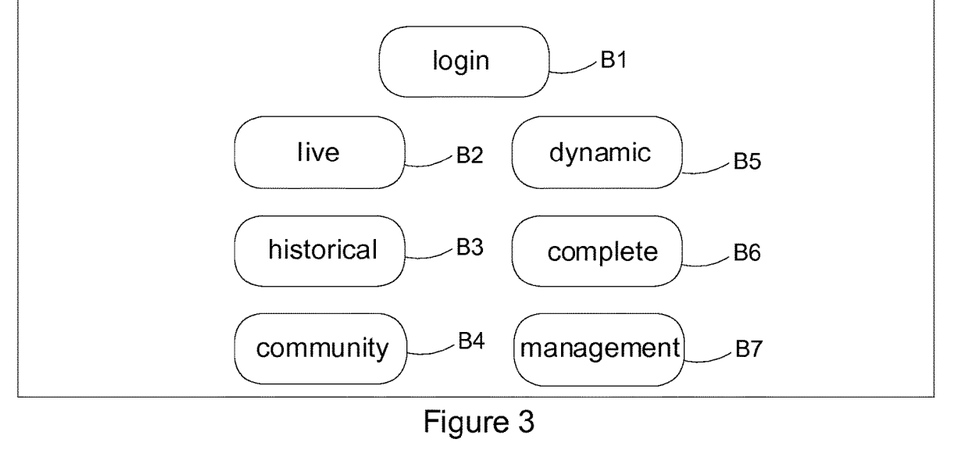
FIG. 3 is a diagrammatic initial screenshot generated by the software modules when run on the network of FIG. 1.

Referring to FIG. 3, a start-up screen on the captain's laptop is shown. He will normally log in (by clicking on button B1 with the laptop mouse) and then select the DYNAMIC module by clicking on button B5. However buttons B2 to B4 provide access to the LIVE, HISTORICAL and COMMUNITY modules which may be accessed to provide background information for working with the DYNAMIC module during the fuel calculation. The COMPLETE module is selected using button B6 after touchdown at the destination. The MANAGEMENT module typically contains the algorithms upon which the key calculations and reference factors rely. This is preferably only accessible by company systems administrators authorized to access this module and may be selected with button B7, if needed.

Figure 4:
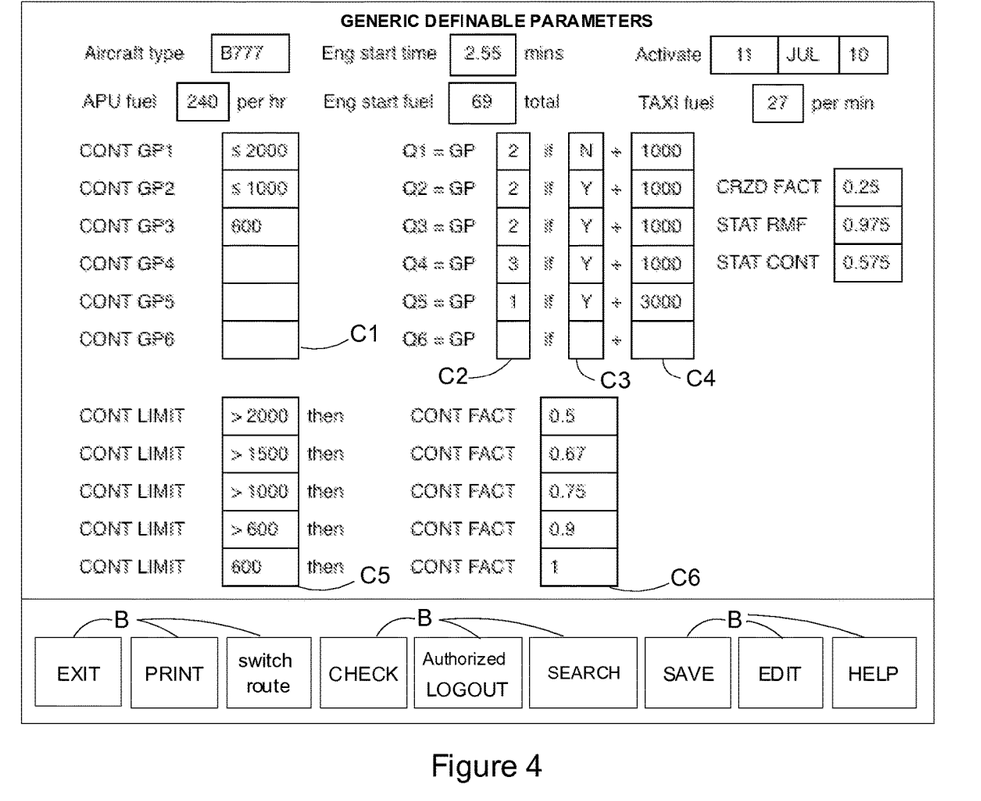
FIG. 4 is a diagrammatic screenshot for an algorithm which generates generic OFP fuel consumption data.
Figure 5:
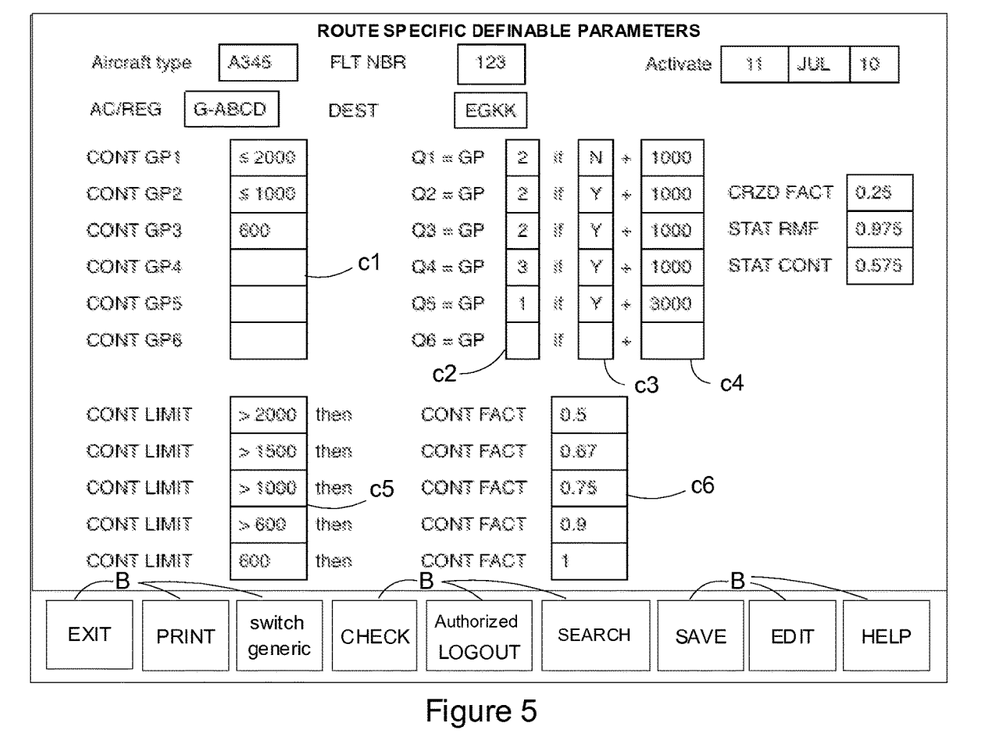
FIG. 5 is a diagrammatic screenshot generated, e.g. by the MANAGEMENT module, for an alternative algorithm which generates route-specific OFP fuel consumption data.

Referring to FIGS. 4 and 5, the MANAGEMENT module, which would normally be operated by specialist administrators on the ground, can operate either with generic definable parameters (FIG. 4) which are not tied to any particular route or with route-specific definable parameters (FIG. 5) if these are available in running the fuel calculation algorithms. The latter provides enhanced accuracy.

Referring to FIG. 4, the MANAGEMENT module includes data entry boxes for the aircraft type, the hourly fuel consumption of APU 1 (FIG. 1) the time taken to start the engines 2 (in minutes) the fuel required to start the engines, the fuel consumption per minute during taxiing and the date of the current version of the module. These data entry boxes are shown at the head of the screen. In addition, as shown at the right of the screen, there are data entry boxes for the CRZD factor (the percentage that must be added to the manufacturer's nominal fuel consumption for the aircraft type to take into account the degradation in fuel consumption of the particular aircraft being flown, due to e.g. dents in its fuselage which impair its aerodynamic performance), STAT RMF (statistical remaining fuel) and STAT CONT (statistical contingency fuel). STAT RMF and STAT CONT may be used to feed into planned landing fuel (PLF) calculations which illustrates to the flight crew the fuel they can expect to carry on landing at the destination and can be calculated in various ways. For example, PLF can be calculated assuming all planned flight fuel is used plus an amount of the remaining contingency fuel (CONT) multiplied by a contingency factor (cf); or multiplying the adjusted ramp fuel value by the statistical remaining fuel value (STAT RMF); or assuming all planned flight fuel is used plus an amount of the remaining contingency fuel (CONT) multiplied by a contingency factor (cf) and multiplied by a statistical contingency factor (STAT CONT). Typically, all three will be calculated and the lowest will be displayed as PLF value to the flight crew. As more data becomes available, the statistical factors become more reliable and the PLF will be more accurate.

The MANAGEMENT module also utilizes, for example, six independent parameters GP1 to GP6 which are associated with respective fuel quantities which collectively make up the total fuel requirement from running the APU 1, starting the engines 2, taxiing from terminal T1, take-off from runway R1, the flight to the destination, holding above the destination, landing on runway R2 and taxiing to terminal T2.

Each of the above parameters GP1 to GP6 is associated with a contingency value CONT GP1 to CONT GP6 respectively (certain values of which are listed in column C1 in FIG. 4) and these represent additional weights of fuel which must be carried in order to satisfy contingencies such as the need to avoid bad weather and the like. Collectively, CONT GP1 to CONT GP6 represent the total additional fuel required to satisfy all recognised contingencies.

Importantly, GP1 to GP6 are modified in dependence upon answers to certain questions Q1 to Q6 (described below in relation to FIG. 6) presented by the DYNAMIC module to the captain on his laptop screen (his user interface). The effect is shown in columns C2, C3 and C4. The parameter number is shown in column C2, the yes/no answer (Y/N) is shown in column C3 and the effect in terms of extra fuel is shown in column C4. For example, referring to the first row (question Q1) in C2, C3 and C4, if the answer to question Q1 is "No" then GP2 is raised by 1000 kg. No values are given for the final row (Q6) because this is unused in the presently described embodiment—extra fuel considerations may be further defined and a relevant question or questions inserted here.

Thus contingency fuel is analysed by contingency and adjusted in response to answers to simple questions given by the captain immediately before fuelling.

Column C5 and column C6 show certain relationships between contingency fuel values ("CONT LIMIT") and a contingency factor ("CONT FACT"). For example if the contingency fuel is greater than 2000 kg, then the contingency factor is 0.5. If the contingency fuel is only 600 kg, then the contingency factor is unity. The contingency factor is a probability factor utilised in an algorithm for calculating the probable weight of fuel remaining on landing at the destination.

The text entry boxes in columns C1 to C4 can be filled in by the administrator. Selection buttons B at the foot of the screen allow the administrator to perform the operations indicated on those buttons.

Referring now to FIG. 5, if route-specific parameters are available then they are used. For example if a route involves flying over water, slightly different fuel consumption may result. This can be taken into account using route-specific parameters.

It will be noted that the screenshot of FIG. 5 shows the aircraft registration code (in this case G-ABCD), the flight number ("FLT NBR") and the destination ("DEST") code (in this case EGKK) which are not included in the generic screenshot of FIG. 4. Otherwise the screenshots are similar, and in particular, columns c1 to c4 relate to the answers to questions Q1 to Q6 in the same manner as columns C1 to C4 relate to the answers to these questions, although the values entered by the administrator in the text entry boxes of c4 differ from the corresponding values in C4.

The constraints represented in columns c5 and c6 are comparable to those of columns C5 and C6 (FIG. 4) respectively.

Figure 6:
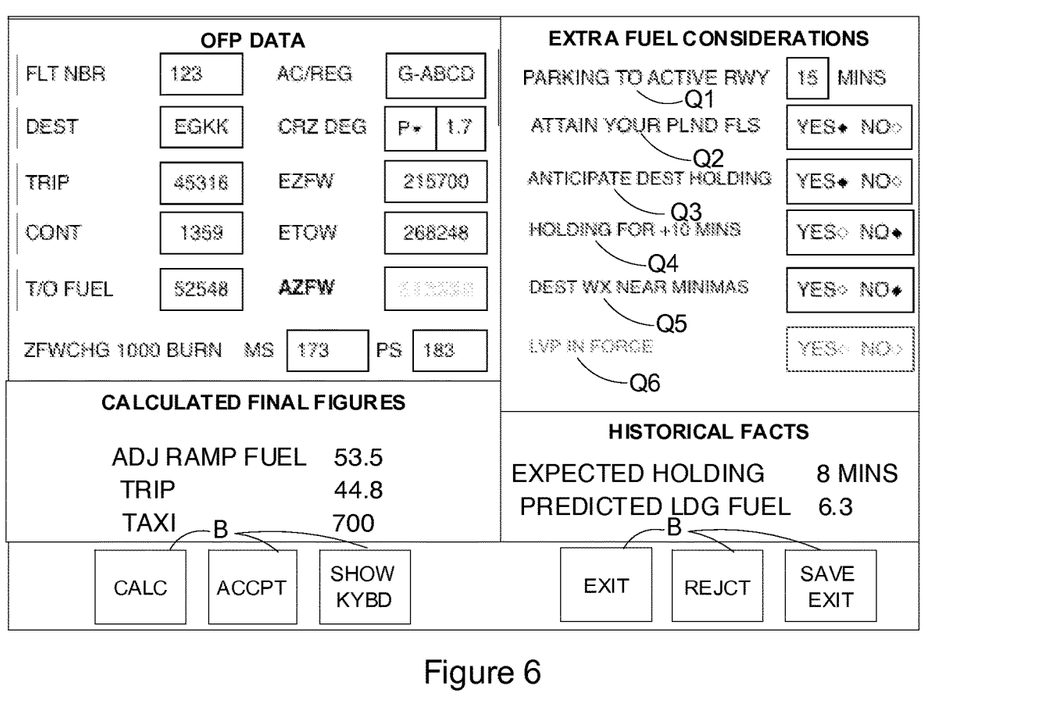
FIG. 6 is a diagrammatic screenshot generated by the DYNAMIC module on the aircraft at the data entry stage.

FIG. 6 shows the information presented interactively to the captain by the DYNAMIC module as he determines the quantity of fuel to uplift (load onto) the aircraft, this quantity being known as the "adjusted ramp fuel" and indicated as "ADJ RAMP FUEL" namely 53.5 metric tonnes in this example.

The top left-hand region of the screen shows "OFP DATA," namely the flight number ("FLT NBR") and aircraft registration code ("AC/REG"), the destination ("DEST"), the expected fuel consumption ("TRIP") for the flight itself (i.e. take-off to landing but excluding taxiing, excluding starting up the engines 2 and excluding 30 minutes running the APU 1) the fuel required ("T/O FUEL") for the flight itself at take-off (i.e. fuel required minus TAXI fuel requirement), the degradation in fuel consumption performance during flight, expressed as a percentage of the nominal fuel consumption of that aircraft type, for the particular aircraft ("CRZ DEG") and the estimated zero fuel weight ("EZFW") and estimated take-off weight ("ETOW") which is equal to EZFW+T/O FUEL. The actual zero fuel weight on take-off ("AZFW") is not known at the time of preparation of the OFP, is not included in the OFP, and therefore is not OFP data. However, once this parameter is known, it is entered by the captain in the AZFW box.

Finally, the OFP section includes boxes MS and PS for the deletions and additions of fuel respectively per 1000 kg of fuel subtracted from or added to the T/O FUEL value. For example if the AZFW were 3,000 kilograms less than the EZFW, and this resulted in a reduction in the calculated fuel requirement of 1,000 kilograms, a further reduction 173 kilograms could be made to take into account the saving in fuel otherwise required to carry the 1000 kg of fuel to the destination.

The EXTRA FUEL CONSIDERATIONS section of the screenshot shows an example of six questions Q1 to Q6 with (in the case of Q1) an associated text entry box and in case of Q2 to Q5 YES/NO buttons. These questions are as follows:

PARKING TO ACTIVE RWAY: The expected taxiing time (in minutes) to the active runway R1 (FIG. 1) which may differ from the taxiing time to the runway assumed in the operational flight plan (OFP) as a result of a last-minute change to the runway selected, e.g. as a result of a change in wind or as a result of noise abatement procedures;

ATTAIN YOUR PLANNED FLS? Are the flight levels (defining altitudes of different sections of the flight) specified in the OFP going to be attained?—they may not be as a result of Air Traffic Control restrictions, other aircraft already occupying the requested flight levels, etc, after generation of the OFP. A change in flight level can change the calculations for fuel consumption requirements for the flight.

ANTICIPATE DEST HOLDING? Is holding anticipated at the destination (e.g. as a result of air traffic congestion, bad weather, earlier delays, etc)? HOLDING FOR+10 MINS: Assuming an affirmative answer to the previous question, is the holding period expected to be greater than 10 minutes?

DEST WX NEAR MINMAS? Is bad weather (possibly necessitating a landing at an alternate airport) expected at the destination?

LVP IN FORCE? Are low visibility procedures in force?

In this example, Q6 and its associated answer button are greyed out because it is known that such procedures are not in force—so the question is assumed answered in the negative.

The captain can access real time live data via has laptop (e.g. weather conditions en route, waiting times at destination airport, etc), using the LIVE module (which, in common with the other software modules, is preferably run on the remote server). Additionally he is made aware of historical statistical data (e.g. typical holding times) relevant to the sector by the HISTORICAL module. These sources of information inform his answers to the above questions.

In response to the captain's answers to questions Q1 to Q6 between boarding the aircraft and fuelling, and in response to the captain selecting the CALC button B to confirm these answers, the DYNAMIC module runs a set of algorithms to calculate the following (as an example) in the CALCULATED FINAL FIGURES box:

ADJ RAMP FUEL: the adjusted ramp fuel value, i.e. the weight of fuel in tonnes required to be uplifted to the aircraft A from the bowser 4 at the ramp position;

TRIP: the amount of fuel in tonnes required for the flight, i.e. while the aircraft is airborne, and TAXI: the amount of fuel in kilograms required for taxiing to the runway R1.

The pilot can accept the resulting figures (by selecting the ACCPT button B) and upload the fuel, or can reject the resulting figures (by selecting the REJCT button B). The latter choice brings up a further screen (not shown) giving the opportunity to override the calculated values, but if the manually selected values are outside safe limits, the DYNAMIC module displays an appropriate warning message.

All of the captain's decisions regarding fuel uplift are recorded electronically on the OFP which is retained after the flight to meet legal requirements. Optionally, this data may also be retrieved by the airline management for monitoring of flying efficiency and the effect of the decisions of the Captain may be reviewed to identify flawed decisions, requirement for training etc, as a management tool.

The screenshot of FIG. 6 also includes a HISTORICAL FACTS section which displays the EXPECTED HOLDING (time)—in this case 8 minutes and the PREDICTED LDG (landing) FUEL (in tonnes). The former figure is generated by the HISTORICAL MODULE and the latter is generated by the DYNAMIC MODULE.

Examples of the algorithms run by the various modules will now be described in general terms, before describing the screenshot of FIG. 7 which is generated by the COMPLETE application after landing at the destination.

The algorithms are typically run in three stages as follows:

i) In a preliminary step the route is checked to see whether route-specific definable parameters are available—if not then generic definable parameters are used (see the screenshots of FIGS. 4 and 5). Units are converted to metric if necessary.

ii) The following main algorithms are run:
ctaxi (to calculate the fuel required for taxiing)
arf (to calculate the adjusted ramp fuel)
ctf (to calculate the trip fuel i.e. fuel consumption during the flight including take-off and landing)
plf (to calculate the planned landing fuel i.e. the fuel remaining on landing)

iii) To complete the process, a fuel saving value and/or a carbon dioxide reduction value are calculated and a safety check is run to ensure that the fuel carried and take-off and landing weights are within safe limits.

Optionally, a further step iv) may be incorporated, either by incorporation in the process above or by using a separate module, in which various calculations that are currently carried out, e.g. in respect of Tankering, Cost Index, Re-Clearance and Alternate Airport Selection and/or Optimum Route Selection, using only Fuel Cost and Time parameters may be advantageously refined, for example by using, in addition, carbon trading or emissions-trading information. Such calculations may form an independent module or be incorporated into the plf algorithm. This optional step is set out in more detail below using Tankering as an example to demonstrate the application. Accordingly, in an example of a further step, Tankering Fuel calculations may be carried out (this may be included in the plf algorithm). Some airlines include in fuelling calculations implications of the varying fuel costs at different locations, because the planned flight comprises more than one leg, e.g. from A landing at B and flying on to land at C. For example, where the fuel cost at a destination airport (B) is significantly higher than the starting airport (A), the OFP may direct additional fueling to save costs, even allowing for the fuel burn required to carry the extra fuel to the destination (B) to enable onward flight to destination (C) without purchasing more fuel. This is a procedure known as Tankering. The method and apparatus of the present invention may also allow for a Tankering procedure to be implemented in the most efficient manner so that any Extra Fuel may be uploaded allowing for calculated requirements for Tankering Fuel. By using, for example, the LIVE module, up-to-date relative fuel cost data may be provided, and the cost efficiency of the Tankering procedure maximized to that particular flight using a further algorithm provided, for example, by the DYNAMIC module (or a separate TANKERING module). Furthermore, the LIVE module may provide access to up-to-date carbon trading or emissions-trading information, and such data included in the Tankering Fuel calculation, in particular in the fuel burn associated with Tankering, the cost not only of the purchase of the fuel but also the carbon trading cost of Tankering fuel-burn. A Tankering calculation can be provided as part of the method and system of the invention described hereinbefore or as a separate module.

Additionally, there is provided in a further aspect of the invention a system for the calculation of the optimum cost-efficient amount of Tankering fuel for an aircraft flight from a pre-determined departure point to a pre-determined destination point, the system comprising a programmed computer arranged to determine a Tankering fuel-burn rate for said flight on the basis of operational flight plan data and further data relevant to fuel consumption for that instance of the flight, said computer configured to receive input data on cost of fuel at departure and destination and carbon trading costs associated with the flight and configured to calculate from said Tankering fuel burn rate and said input data an optimum Tankering fuel load for the flight.

In a still further aspect, there is provided a method for the fuelling of an aircraft with Tankering fuel for a flight from a pre-determined departure point to a pre-determined destination point, wherein the fuel requirement for the flight is determined, an optimum Tankering fuel load is determined by Tankering fuel calculation software from a calculated Tankering fuel-burn rate, the differential cost of fuel at the destination point and the departure point and the carbon trading cost of Tankering fuel-burn for the flight, said Tankering fuel-burn rate being determined on the basis of operational flight plan data and further data relevant to fuel consumption for that instance of the flight, and subsequently fuel to meet said fuel requirement and a determined optimum amount of Tankering fuel is uplifted to the aircraft under the control of the user.

Tankering fuel is defined here as the amount of extra fuel required at departure point to achieve a certain amount of extra fuel remaining at the destination (destination-Tankered fuel). That is, the Tankering fuel is equal to the destination-Tankered fuel plus the Tankering fuel-burn (that is, the fuel burn associated only with carrying extra Tankering fuel).

Preferably, the same data sources and calculations used to determine a fuel requirement for a flight is adapted and used to determine the Tankering fuel-burn.

With reference to the algorithms referred to above for the purpose of putting the invention into effect according to one embodiment involving defined steps i), ii) and iii), steps i) and iii) do not require further explanation. The algorithms of step ii) are given by way of Example below. Generic or route-specific parameters available to the algorithms are shown in italics and variables entered on screen (see the above discussion of the screenshots) by the captain or flight crew or calculated by a preceding algorithm from such entered variables are shown in bold.

EXAMPLE ctaxi Algorithm $$ctaxi = (apuf \times 0.5) + esf + ((tt - est) \times tf)$$

ctaxi is the total fuel consumption involved in taxiing.
apuf is the hourly fuel consumption of the APU 1. The 0.5 figure represents the assumed half-hour run time of the APU.
esf is the fuel required to start the engines 2.
tt is the taxiing time and is entered by the captain/flight crew (see question Q1 in FIG. 6). The HISTORICAL algorithm of FIG. 6 provides historical data, adjusted for seasonal changes, for this parameter which can be used to guide the answer to question Q1.
est is the time taken for the engines to start, normally 1 to 2 minutes.
tf is the rate of fuel consumption during taxiing.

arf Algorithms 1) and 2)

Required code: zfwdiff (zero fuel weight difference)
=(AZFW−EZFW)/1000    1)

(The divisor of 1000 converts from kilograms to tonnes)
If zfwdiff positive then x zfwdiff by PS=PSzfw
If zfwdiff negative then x zfwdiff by MS=MSzfw
(MS and PS are shown in the OFP DATA section of FIG. 6).
(cg1 and cg2 etc are contingency groups, which control fuel additive questions—if there is a high CONT, there will be answers that do not require an additive question)

If CONT ≤ cg1 then
  if Q5 = Yes then tof5 = p5
  (see question Q5 and CONT in FIG. 6)
    If CONT ≤ cg2 then
if Q1 = No then tof1 = p1
if Q2 = Yes then tof2 = p2
if Q3 = Yes then tof3 = p3
  (see questions Q1 to Q3 in FIG. 6)
If CONT ≤ cg3
    Q4 = Yes then tof4 = p4
    if CRZ DEG = P then tofcrzd = crzd × crzdf × CONT
  (CRZ DEG is cruise degradation - a cruise degradation figure
is applied to an aircraft to account for the variation in fuel burn as a result
of age and imperfections. The higher the value attributed to CRZ DEG,
the more likely it is to have a small fuel additive to account for it).

Required code: newtof (new take-off fuel)=tof((+
PSzfw) or (−MSzfw))+tof1+tof2+tof3+tof4+
tof5+tof6+tofcrzd(thus newtof is the New Take-
Off Fuel weight i.e. the actual weight of fuel at
take-off)    2)

arf=newtof+ctaxi ctf Algorithms

Required code: atow (actual take-off weight)
=AZFW+newtof

Required code: towdiff (take-off weight difference)=
(ATOW−ETOW)/1000

If towdiff positive then x towdiff by PS=PStow
If towdiff negative then x towdiff by MS=MStow ctf=TRIP((+pbtow) or (−mbtow))

(AZFW, ETOW and TRIP are given in the OFP data section of FIG. 6).

plf Algorithms

Required code: cf (contingency factor) (this defines the contingency factor: it is assumed that a small amount of CONT (contingency fuel) may be used up on a flight and a large portion should be expected, typically, to remain unused; i.e. if the CONT fuel is expected to be less than or equal to a defined contingency limit (e.g. cl1) then a first contingency factor applies to cf-relevant calculation, if not then the same test is carried out relevant a further contingency limit associated with a further contingency factor, until the appropriate contingency factor is determined).

If CONT ≤ cl1 then cf = cf1 or
If CONT ≤ cl2 then cf = cf2 or
    If CONT ≤ cl3 then cf = cf3 or
    If CONT ≤ cl4 then cf = cf4 or
    If CONT ≤ cl5 then cf = cf5
plf = arf - ctf - ctaxi - tof1 - tof2 - tof3 - tof4 - tof5 - tof6 -
((CONT - tofcrzd) × cf)(this defines predicted landing fuel =
adjusted ramp fuel - calculated trip fuel - calculated taxi fuel - [fuel
additives] - expected used part of contingency fuel)
or
*plf = arf × srmf
or
*plf = arf - ctf - ctaxi - tof1 - tof2 - tof3 - tof4 - tof5 - tof6 -
((CONT - tofcrzd) × scont)
*These possibilities involving statistically derived parameters srmf and
scont can be used when sufficient data has been collated by the
COMPLETE MODULE.

Figure 7:
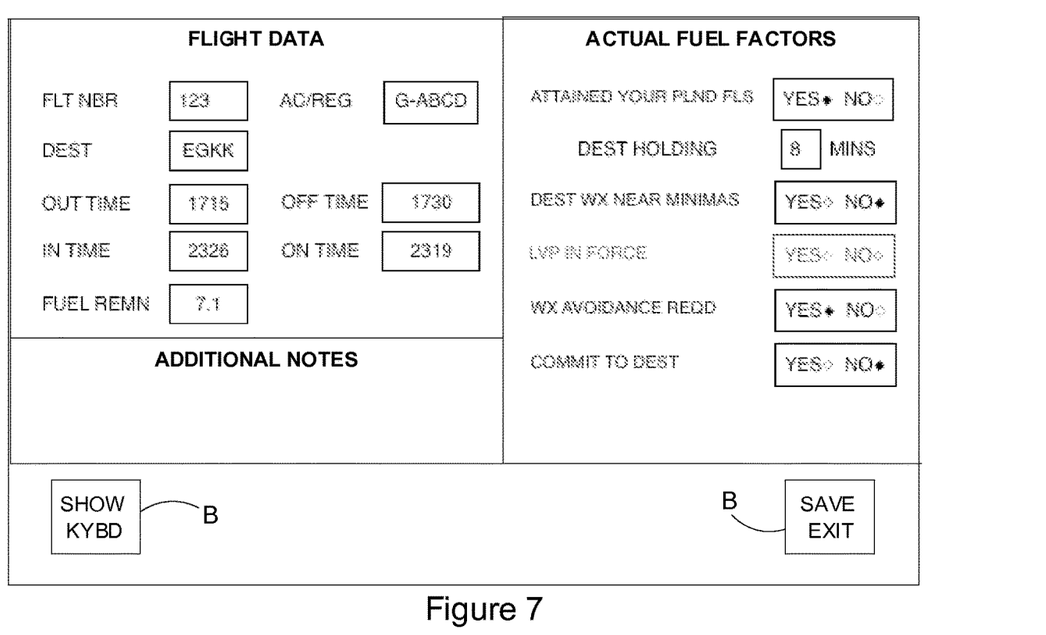
FIG. 7 is a diagrammatic screenshot generated by the COMPLETE module on the aircraft at the data entry stage (at the end of the flight).

Referring now to FIG. 7, when the aircraft has landed at its destination, the COMPLETE module is run to acquire, either manually from the flight crew or automatically from aircraft instruments, the FLIGHT DATA and ACTUAL FUEL FACTORS shown. The latter correspond to the (with hindsight) correct answers to questions Q1 to Q6 of FIG. 6. This information is saved (by selecting a button B) and fed to the HISTORICAL, MANAGEMENT and LIVE modules (FIG. 2) for current and future reference.

The invention claimed is:

1. A method of fuelling an aircraft for a single instance of a flight from a departure point to a predetermined destination in order to minimize fuel consumption and $CO_2$ emissions for that single instance of a flight, wherein the method comprises:
    setting an initial total quantity of fuel based on an operational flight plan two or three hours before take-off which is based upon an estimated zero fuel weight and subsequently;
    determining an actual and individual weight of passengers and crew and their carry-on luggage by weighing, prior to boarding the aircraft, individual passengers and crew and their carry-on luggage intending to board the aircraft and determining therefrom an actual combined weight of passengers and crew intending to board the aircraft and their carry-on luggage;

determining the actual zero fuel weight of the aircraft when loaded from the determined actual combined weight of passengers and crew and their carry-on luggage;

calculating the fuel requirement of the loaded aircraft for that destination by fuel calculation software executed on a computer on the basis of:

operational flight plan data for that instance of the flight;

said actual zero fuel weight; and second data relevant to fuel consumption for that instance of the flight to the predetermined destination, said second data being data liable to change after the time an operational flight plan is produced using operational flight plan data, said second data comprising one or more of taxi time to runway, taxi time at destination, holding time at destination, contingency fuel, implementation of low visibility procedures, and weather at departure point, en route and at destination, said further data being processed interactively by a member of flight crew for that instance of the flight by means of a user interface to said fuel calculation software, said user interface being provided for use on the aircraft, the calculated fuel requirement including an amount of contingency fuel, which amount of contingency fuel is re-calculated in dependence upon said further data; and subsequently, in either order, loading the craft, and uplifting to the aircraft fuel to meet said fuel requirement is under the control of a member of the flight crew.

2. A method according to claim 1, wherein the quantity of fuel remaining on arrival at the destination is calculated in dependence upon said second data.

3. A computer program product comprising a computer-readable medium incorporating program code executable by a processor to implement a method of fueling an aircraft for a single instance of a flight from a departure point to a predetermined destination in order to minimize fuel consumption and $CO_2$ emissions for that single instance of a flight as defined in claim 1.

* * * * *